(12) United States Patent
Seo et al.

(10) Patent No.: US 7,761,422 B2
(45) Date of Patent: Jul. 20, 2010

(54) METHOD AND APPARATUS FOR REPRODUCING DATA FROM RECORDING MEDIUM USING LOCAL STORAGE

(75) Inventors: Kang Soo Seo, Anyang-si (KR); Jea Yong Yoo, Seoul (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 167 days.

(21) Appl. No.: 11/325,317

(22) Filed: Jan. 5, 2006

(65) Prior Publication Data
US 2006/0153016 A1 Jul. 13, 2006

Related U.S. Application Data

(60) Provisional application No. 60/641,780, filed on Jan. 7, 2005.

(30) Foreign Application Priority Data

Jun. 9, 2005 (KR) ............... 10-2005-0049470

(51) Int. Cl.
G06F 7/00 (2006.01)
(52) U.S. Cl. .................................... 707/637
(58) Field of Classification Search ............ 707/1, 707/2, 7, 10, 100
See application file for complete search history.

(56) References Cited

U.S. PATENT DOCUMENTS

| 5,596,565 | A | 1/1997 | Yonemitsu et al. |
| 5,644,782 | A | 7/1997 | Yeates et al. |
| 5,778,389 | A | 7/1998 | Pruett et al. |
| 5,930,768 | A | 7/1999 | Hooban |
| 5,982,980 | A | 11/1999 | Tada |
| 6,021,438 | A | 2/2000 | Duvvoori et al. |

(Continued)

FOREIGN PATENT DOCUMENTS

CA 2 373 641 9/2001

(Continued)

OTHER PUBLICATIONS

International Search Report issued Jun. 16, 2006 in corresponding International Patent Application No. PCT/KR2005/004648.

(Continued)

*Primary Examiner*—Charles Rones
*Assistant Examiner*—Fazlul Quader
(74) *Attorney, Agent, or Firm*—Harness, Dickey & Pierce, P.L.C.

(57) ABSTRACT

A method and apparatus for reproducing data from a recording medium using a local storage is disclosed. A method for reproducing data from a recording medium using a local storage includes the steps of: a) downloading an additional data file and a binding unit manifest file, and storing the additional data file and the binding unit manifest file in the local storage; b) determining a binding unit from among the downloaded additional data file according to the binding unit manifest file; c) performing a binding operation for binding the binding unit with an original data file contained in the recording medium according to the binding unit manifest file, and forming a virtual package; and d) reproducing additional data and original data using the formed virtual package.

14 Claims, 13 Drawing Sheets

U.S. PATENT DOCUMENTS

| | | |
|---|---|---|
| 6,269,371 B1 | 7/2001 | Ohnishi |
| 6,381,202 B1 | 4/2002 | Shimoda |
| 6,675,382 B1 * | 1/2004 | Foster .................... 717/177 |
| 6,775,803 B1 | 8/2004 | Chung et al. |
| 6,928,613 B1 | 8/2005 | Ishii et al. |
| 6,938,005 B2 * | 8/2005 | Iverson et al. ............ 705/27 |
| 6,980,979 B2 | 12/2005 | Huang et al. |
| 7,039,863 B1 * | 5/2006 | Caro et al. ............... 715/530 |
| 7,191,392 B1 | 3/2007 | Coar |
| 7,349,923 B2 | 3/2008 | Spring et al. |
| 7,477,833 B2 | 1/2009 | Kato et al. |
| 7,555,483 B2 | 6/2009 | Maeda et al. |
| 2001/0015940 A1 | 8/2001 | Yokota et al. |
| 2001/0026502 A1 | 10/2001 | Zimmer |
| 2001/0037356 A1 * | 11/2001 | White et al. ............ 709/201 |
| 2002/0001395 A1 | 1/2002 | Davis et al. |
| 2002/0048224 A1 | 4/2002 | Dygert et al. |
| 2002/0143795 A1 | 10/2002 | Fletcher et al. |
| 2002/0161571 A1 | 10/2002 | Matsushima et al. |
| 2002/0194618 A1 * | 12/2002 | Okada et al. ............ 725/132 |
| 2003/0041110 A1 | 2/2003 | Wenocur et al. |
| 2003/0056029 A1 | 3/2003 | Huang et al. |
| 2003/0072453 A1 | 4/2003 | Kelly et al. |
| 2003/0105743 A1 | 6/2003 | Ireton |
| 2003/0109306 A1 | 6/2003 | Karmarkar |
| 2003/0152366 A1 | 8/2003 | Kanazawa et al. |
| 2003/0163486 A1 | 8/2003 | Van Der Meulen |
| 2003/0180031 A1 | 9/2003 | Kikuchi et al. |
| 2003/0202431 A1 | 10/2003 | Kim et al. |
| 2003/0228134 A1 | 12/2003 | Kim et al. |
| 2003/0235402 A1 | 12/2003 | Seo et al. |
| 2003/0235406 A1 | 12/2003 | Seo et al. |
| 2004/0051812 A1 | 3/2004 | Hayward |
| 2004/0054541 A1 | 3/2004 | Kryze et al. |
| 2004/0078293 A1 | 4/2004 | Iverson et al. |
| 2004/0101285 A1 | 5/2004 | Seo et al. |
| 2004/0199566 A1 | 10/2004 | Carlson et al. |
| 2004/0210584 A1 | 10/2004 | Nir et al. |
| 2004/0235402 A1 | 11/2004 | Bjelopavlic et al. |
| 2005/0018854 A1 | 1/2005 | Yamamoto et al. |
| 2005/0108466 A1 | 5/2005 | Takashima et al. |
| 2005/0169132 A1 | 8/2005 | Kuraoka et al. |
| 2005/0262149 A1 | 11/2005 | Jung et al. |
| 2006/0013562 A1 | 1/2006 | Sugino et al. |
| 2006/0020932 A1 | 1/2006 | Bentz et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0155790 A1 | 7/2006 | Jung et al. |
| 2006/0156354 A1 | 7/2006 | Jung et al. |
| 2006/0227973 A1 | 10/2006 | Takashima et al. |
| 2007/0006276 A1 | 1/2007 | Ashley et al. |
| 2007/0038989 A1 | 2/2007 | Newton et al. |
| 2008/0025182 A1 | 1/2008 | Seo et al. |
| 2008/0031599 A1 | 2/2008 | Ikeda et al. |

FOREIGN PATENT DOCUMENTS

| | | |
|---|---|---|
| CN | 1898742 | 1/2007 |
| CN | 1954384 | 4/2007 |
| EP | 0101133 | 2/1984 |
| EP | 0 737 912 A2 | 10/1996 |
| EP | 0 737 975 A2 | 10/1996 |
| EP | 0 801 384 A2 | 10/1997 |
| EP | 1 014 372 | 6/2000 |
| EP | 1 032 229 A2 | 8/2000 |
| EP | 1 408 505 A1 | 4/2004 |
| EP | 1 426 961 A1 | 6/2004 |
| EP | 1 437 737 A2 | 7/2004 |
| EP | 1 513 152 A1 | 3/2005 |
| EP | 1 536 427 | 6/2005 |
| EP | 1 553 769 A1 | 7/2005 |
| EP | 1551027 | 7/2005 |
| EP | 1789958 | 3/2006 |
| EP | 1 718 074 A1 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002-049518 | 2/2002 |
| JP | 2002-288941 | 10/2002 |
| JP | 2004-214918 | 7/2004 |
| JP | 2006-040473 | 2/2006 |
| KR | 10-2004-0039885 A | 5/2004 |
| TW | 583538 | 4/2004 |
| WO | WO 95/12197 | 5/1995 |
| WO | WO 96/11446 | 4/1996 |
| WO | WO 1996/011446 | 4/1996 |
| WO | WO 01/67668 A1 | 9/2001 |
| WO | WO 2004/001752 A1 | 12/2003 |
| WO | WO 2004/001754 A1 | 12/2003 |
| WO | WO 2004/023479 A1 | 3/2004 |
| WO | WO 2004/025651 | 3/2004 |
| WO | WO 2004/030356 A1 | 4/2004 |
| WO | WO 2004/042723 A1 | 5/2004 |
| WO | WO 2004/047100 A1 | 6/2004 |
| WO | WO 2004/047104 A1 | 6/2004 |
| WO | WO 2004/081936 | 9/2004 |
| WO | WO 2004/100048 A2 | 11/2004 |
| WO | WO 2004/114658 A1 | 12/2004 |
| WO | WO 2005/002220 A1 | 1/2005 |
| WO | WO 2005/045834 | 5/2005 |
| WO | 2005/052941 A1 | 6/2005 |
| WO | WO 2005/050528 A2 | 6/2005 |
| WO | WO 2005/055205 A2 | 6/2005 |
| WO | WO 2005052941 | 6/2005 |
| WO | WO 2005/078727 A1 | 8/2005 |
| WO | WO 2005079063 | 8/2005 |
| WO | WO 2005/091637 A1 | 9/2005 |
| WO | WO 2005/124763 A1 | 12/2005 |

OTHER PUBLICATIONS

International Search Report issued Jun. 29, 2006 in corresponding International Patent Application No. PCT/KR2006/000020.

International Search Report issued May 10, 2006 in International Patent Application No. PCT/KR2005/003771.

International Search Report issued May 30, 2006 in International Patent Application No. PCT/KR2005/004647.

European Search Report issued Apr. 8, 2008 by the EPO in EP Application No. 05776011.8-2223.

European Search Report issued Mar. 26, 2008 by the EPO in EP Application No. 07107743.2-2223.

U.S. Office Action corresponding to U.S. Appl. No. 11/325,341, filed Nov. 13, 2008.

U.S. Office Action corresponding to U.S. Appl. No. 11/224,245, filed Dec. 10, 2008.

Office Action for U.S. Appl. No. 11/292,105, filed Feb. 5, 2009.

USPTO Office Action dated May 28, 2009 for corresponding U.S. Appl. No. 11/325,493.

USPTO Office Action dated Sep. 18, 2009 for corresponding U.S. Appl. No. 11/325,341.

USPTO Office Action dated May 12, 2009 for corresponding U.S. Appl. No. 11/224,245.

Little, Charles Q. et al.: "Forensic 3D Scene Reconstruction", Sandia National Laboratories, Nov. 2, 1999, pp. 1-8.

Russian Notice of Allowance dated Sep. 24, 2009 for corresponding Application No. 2007107811.

Chinese Office Action dated May 8, 2009 for corresponding Application No. 200580030609.2.

USPTO Office Action dated May 12, 2009 for corresponding U.S. Appl. No. 11/268,552.

USPTO Office Action dated Aug. 18, 2009 for corresponding U.S. Appl. No. 11/246,231.

European Search Report dated Nov. 11, 2009 for corresponding Application No. 05786904.2.

Blu-ray Disc Founders: "White Paper Blu-ray Disc Format 2.A Logical and Audio Visual Application Format Specifications for BD-RE", Aug. 2004.

Blu-ray Disc Founders: "White Paper Blu-ray Disc Format General", Aug. 2004.

Blu-ray Disc Founders: "White Paper Blu-ray Disc Format 3. File System Specifications for BD-RE, R, Rom", Aug. 2004.

European Search Report dated Nov. 30, 2009 for corresponding Application No. 05786908.3.

USPTO Office Action dated Nov. 23, 2009 for corresponding U.S. Appl. No. 11/325,493.

European Search Report dated Nov. 20, 2009 for corresponding Application No. 05819111.5.

Blu-ray Disc: "White Paper Blu-ray Disc Format 2.B Audio Visual Application Format Specifications for BD-ROM", Mar. 2005.

Blu-ray Disc: "Application Definition Blu-ray Disc Format BD-J Baseline Application and ogical Model Definition for BD-ROM" Mar. 2005.

U.S. Office Action dated Apr. 1, 2010 for U.S. Appl. No. 11/325,493.

Russian Notice of Allowance dated Feb. 2, 2010 for corresponding Russian Application No. 2007115808/28(017168).

* cited by examiner

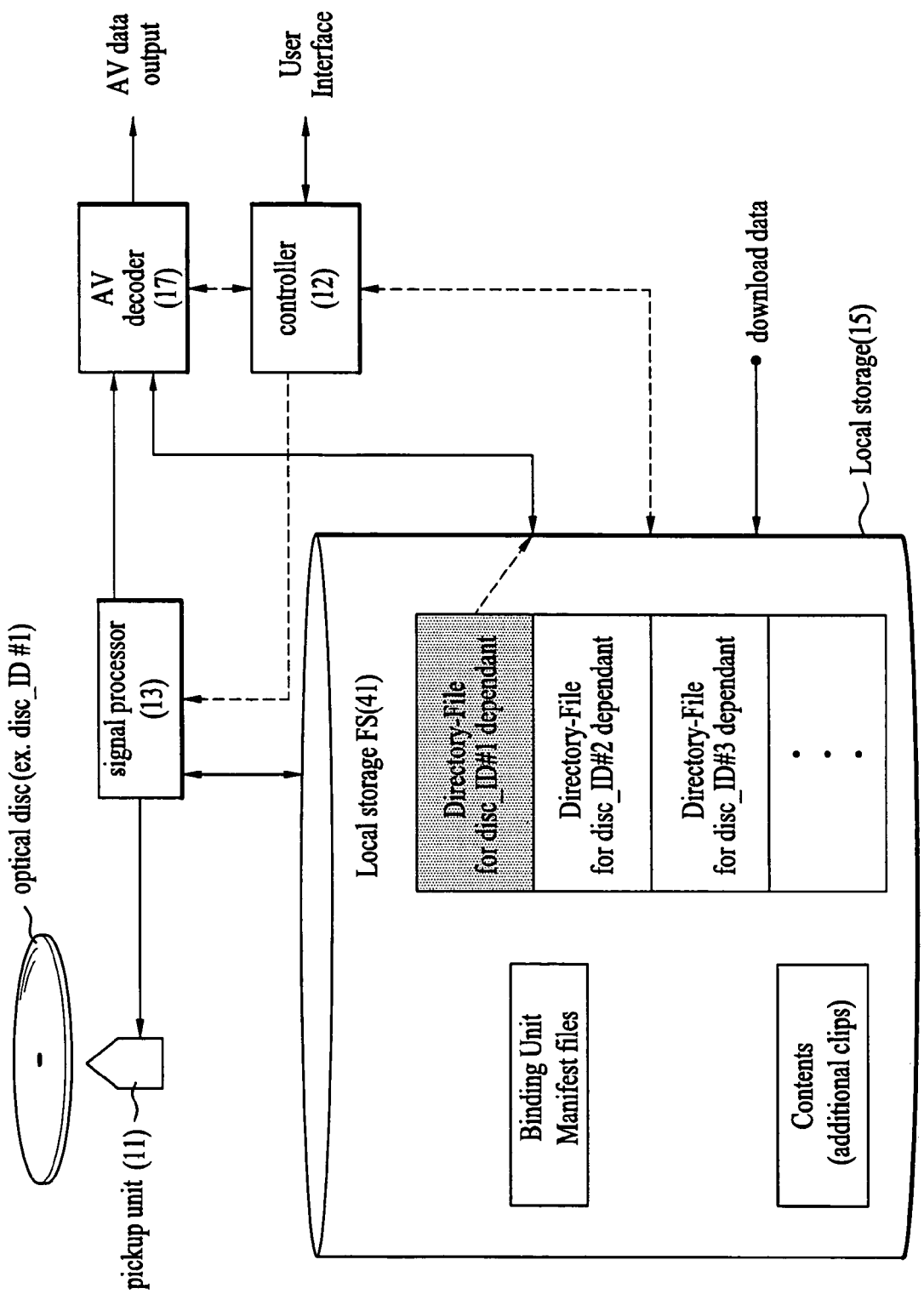

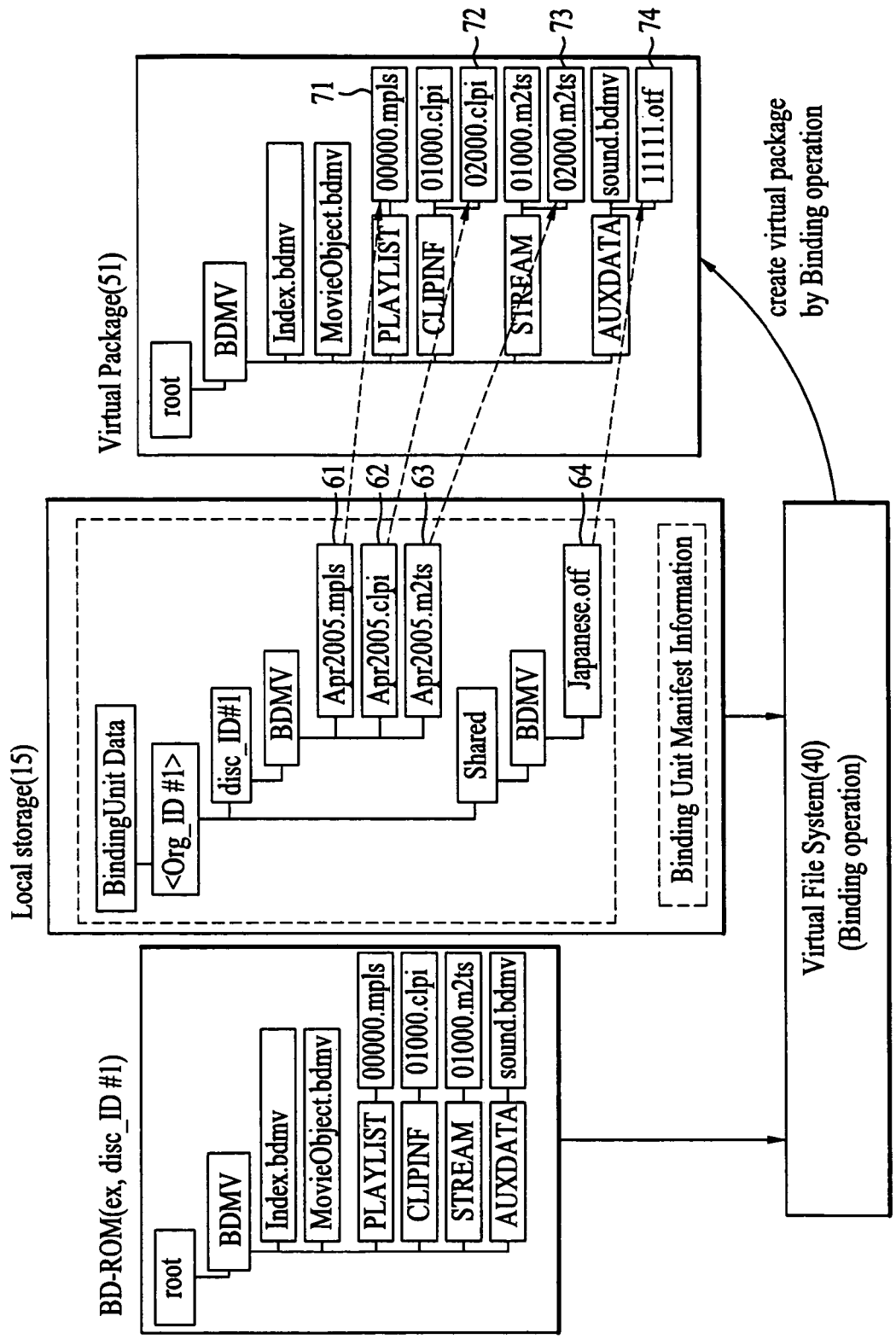

METHOD AND APPARATUS FOR REPRODUCING DATA FROM RECORDING MEDIUM USING LOCAL STORAGE

This application claims the benefit of Korean Patent Application No.10-2005-0049470, filed on, Jun. 9, 2005, which is hereby incorporated by reference as if fully set forth herein.

This application claims the benefit of U.S. Provisional Application No. 60/641,780, filed on Jan. 7, 2005, in the name of inventors Jea Yong YOO, Kang Soo SEO and Byung Jin KIM, entitled "LOCAL STORAGE FOR HIGH DENSITY OPTICAL DISC", which is hereby incorporated by reference as if fully set forth herein.

BACKGROUND OF THE INVENTION

1. Field of the Invention

The present invention relates to a method and apparatus for reproducing data from a recording medium, and more particularly to a method and apparatus for reproducing data from a recording medium using a local storage contained in an optical recording/reproducing device.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed an optical recording/reproducing device based on the BD international standard, but the BD international standard has not yet been completed, such that many limitations and problems occur in developing the optical recording/reproducing device.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, an apparatus for reproducing data from the recording medium to simultaneously reproduce the external input signal and data of the BD has not yet been established, such that many limitations and problems occur in developing a BD-based optical recording/reproducing device.

SUMMARY OF THE INVENTION

Accordingly, the present invention is directed to a method and apparatus for reproducing data from a recording medium using a local storage that substantially obviate one or more problems due to limitations and disadvantages of the related art.

An object of the present invention is to provide a method and apparatus for downloading data from an external part, storing the downloaded in a local storage, and reproducing data stored in a recording medium such as a BD and data stored in the local storage using manifest file information stored in the local storage in order to simultaneously reproduce the data of the local storage and the data of the recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data from a recording medium using a local storage comprises the steps of: a) downloading an additional data file and a binding unit manifest file, and storing the additional data file and the binding unit manifest file in the local storage; b) determining a binding unit from among the downloaded additional data file according to the binding unit manifest file; c) performing a binding operation for binding or combining the binding unit with an original data file contained in the recording medium according to the binding unit manifest file, and forming a virtual package; and d) reproducing additional data and original data using the formed virtual package.

In another aspect of the present invention, there is provided a method for forming a virtual package comprising the steps of: a) downloading an additional data file and a binding unit manifest file, and storing the additional data file and the binding unit manifest file in the local storage; b) determining a binding unit from among the downloaded additional data file according to the binding unit manifest file; c) performing a binding operation for binding or combining the binding unit with an original data file contained in the recording medium according to the binding unit manifest file, and forming a virtual package; and d) allowing the binding unit manifest file to include an additional data file name mapped to the virtual package, and forming the virtual package using the additional data file when the additional data file name is equal to an original data file name.

In yet another aspect of the present invention, there is provided an apparatus for reproducing data from a recording medium using a local storage comprising: a pickup unit for reading original data from the recording medium; a local storage for storing additional data associated with the original data and a binding unit manifest file; and a controller for determining a binding unit from among the additional data according to the binding unit manifest file, performing a binding operation for binding or combining the binding unit with an original data file according to the binding unit manifest file, forming a virtual package, and reproducing additional data and original data using the formed virtual package.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4B is a block diagram illustrating an apparatus for reproducing data using a local storage from among overall components contained in the optical recording/reproducing device according to the present invention;

FIG. 9 is a conceptual diagram illustrating a method for forming a virtual package using a virtual file system (VFS) on the basis of a file structure according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for reproducing data from a recording medium using a local storage will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. It should be noted that the term "Disc" is considered to be the same as the recording medium according to the present invention.

For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

Figure 1:
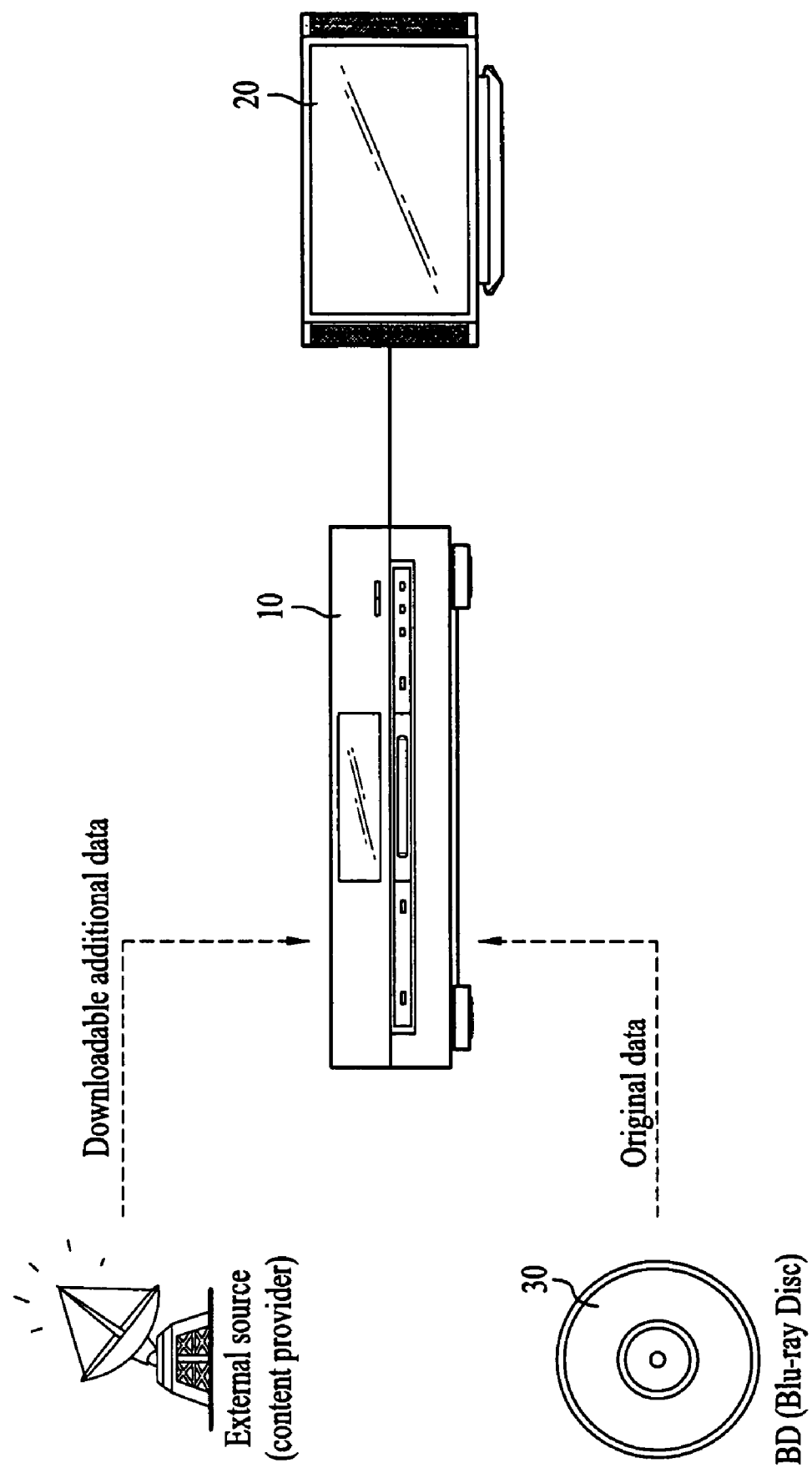
FIG. 1 is a conceptual diagram illustrating a method and apparatus for reproducing data from a recording medium according to the present invention.

The term "local storage" is indicative of a storage unit contained in an optical recording/reproducing device 10 shown in FIG. 1. In more detail, the term "local storage" is indicative of a component capable of receiving necessary information or data from a user, and storing the received information or data. For example, a general local storage may be indicative of a Hard Disc Drive (HDD), but it should be noted that the term "local storage" of the present invention is not limited to the HDD, and is applicable to other examples as necessary.

Particularly, the term "local storage" is indicative of a storage unit for storing data associated with a recording medium such as a BD. The data associated with the recording medium is generally downloaded from an external device.

In association with the above-mentioned description, it is obvious to those skilled in the art that the local storage may directly read some permission data from the recording medium, and may generate system data (e.g., metadata) associated with record/reproduction operations of the recording medium, such that the system data may be stored in the local storage.

The term "binding unit" is indicative of a set of files stored in the local storage. Particularly, the binding unit is indicative of a set of information (i.e., information set) associated with a specific recording medium. In this case, the information set is combined with or is added to a file contained in the recording medium, such that it can simultaneously reproduce data of the recording medium and data of the local storage.

For the convenience of description, data recorded in the recording medium is referred to as "original data", data associated with the recording medium from among a plurality of data units stored in the local storage is referred to as "additional data".

FIG. 1 is a conceptual diagram illustrating a method and apparatus for reproducing data according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention exemplarily uses a BD-player capable of reproducing data from the BD or a BD-recorder capable of recording data in the BD in consideration of correlation between the BD and peripheral devices for the convenience of description. In association with the above-mentioned description, it is well known in the art that the optical recording/reproduction device 10 is also applicable to a drive embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

In association with the above-mentioned description, a person for providing content data used as an external source is generally referred to as a content provider (CP).

When original data is recorded in the optical disc 30 seated in the optical recording/reproducing device 10, and additional data associated with the original data is present in other storage places (e.g., Internet), the present invention aims to reproduce the original data and the additional data at the same time.

For example, it is assumed that multiplexed AV (Audio/Video) streams are recorded as the original data recorded in the optical disc, and additional data for use in the Internet is an audio stream different from an audio stream (e.g., Korean) of the original data. In this case, some users may download a specific audio stream (e.g., English) acting as additional data from the Internet, may desire to reproduce the downloaded audio stream along with the AV stream acting as original data, or may desire to reproduce only the additional data. In order to implement the above-mentioned desires of the users, correlation between the original data and the additional data must be established, and there is needed a systemized method for managing/reproducing the above-mentioned data according to a user request.

For the convenience of description, although a signal recorded in the disc is referred to as the original data, and other signals existing in the outside of the disc are referred to as the additional data, it should be noted that the original data and the additional data classified according to their data acquisition methods are not limited to only specific data.

Generally, additional data may be indicative of audio data, presentation graphic (PG) data, interactive graphic (IG) data, or text subtitle, etc., but the additional data may also be indicative of a multiplexed AV stream including the above-mentioned data and video data. In other words, data associated with the original data simultaneously existing in the outside of the optical disc may act as additional data.

In order to satisfy the above-mentioned user requests, a predetermined file structure must be established between the original data and the additional data. Accordingly, a file structure and data record structure for use in the BD will hereinafter be described with reference to FIGS. 2□3.

Figure 2:
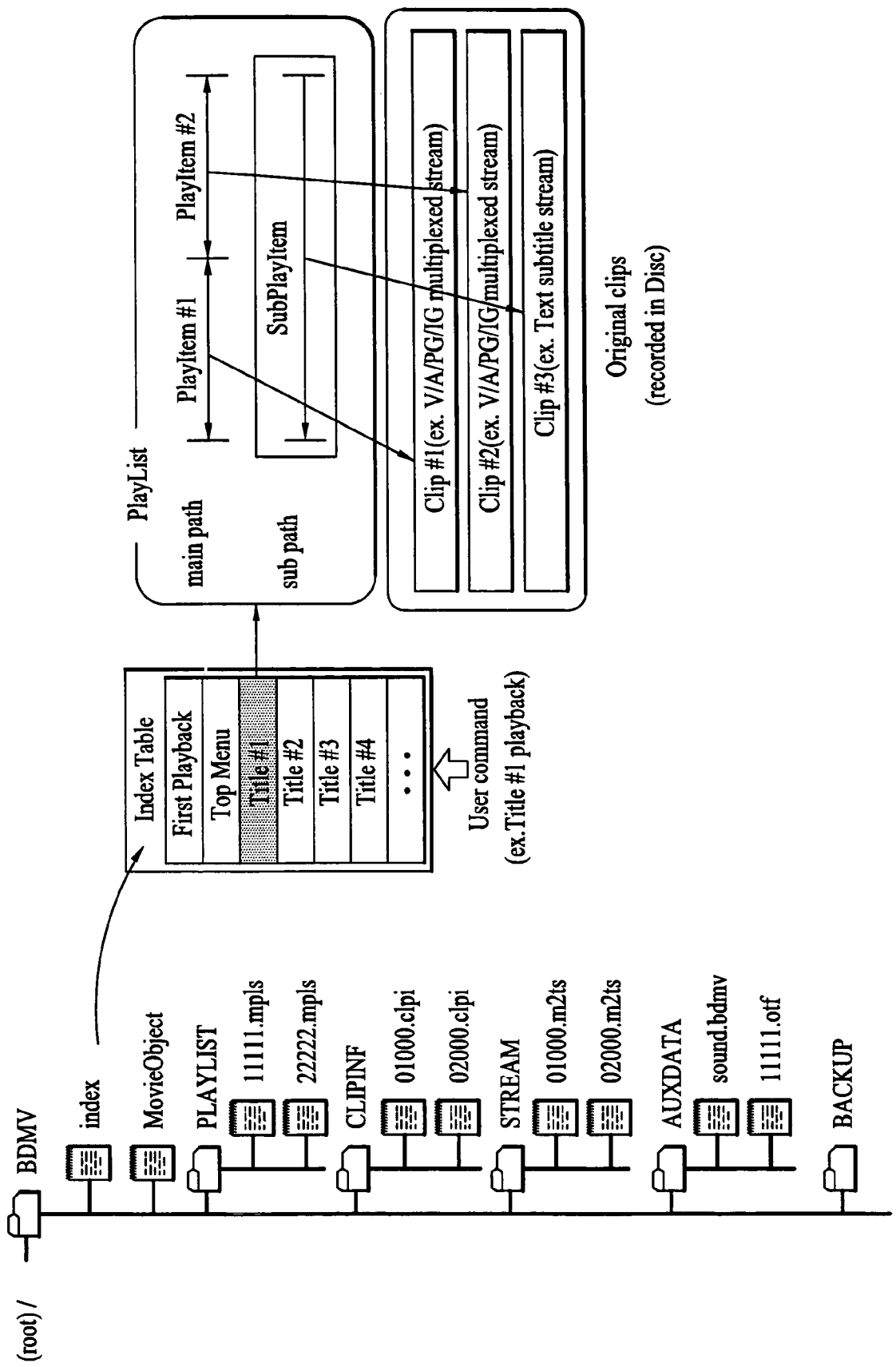
FIG. 2 is a conceptual diagram illustrating a file structure recorded in an optical disc acting as a recording medium and a method for reproducing a specific title using the file structure.

FIG. 2 is a conceptual diagram illustrating a file structure for reproducing/managing the original data recorded in an optical disc, and a method for reproducing a specific title according to the file structure.

Referring to FIG. 2, the file structure according to the present invention includes one or more BD directories (BDMV) under a single root directory. The BD directory (BDMV) includes not only an index file "index" acting as a general file (i.e., an upper file) capable of guaranteeing user interactivity, but also the above-mentioned object. The file structure includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUXDATA), and a backup directory (BACKUP). The above-mentioned directories and a variety of files included in the directory will hereinafter be described.

The AUXDATA directory includes an additional data file for reproducing data of the disc. For example, the AUXDATA directory includes a "Sound.bdmv" file for providing a user with sound data when an interactive graphic function is executed, and an "11111.otf" file for providing the user with font information when data of the disc is reproduced.

The stream directory (STREAM) includes a plurality of AV stream files recorded in a disc according to a specific format. Generally, individual streams are recorded using an MPEG-2 based transport packet, and the stream directory (STREAM) uses extension names of stream files (01000.m2ts and 02000.m2ts) as a specific extension name "*.m2ts". Particularly, if video/audio/graphic information from among the above-mentioned streams is multiplexed, the multiplexed information is called an AV stream, and a single title is composed of at least one AV stream file.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files (*.m2ts) therein. The clip-info files (*.clpi) connected to the stream files (*.m2ts) on a one-to-one basis are generically named a "Clip". In other words, this means that a single clip is indicative of data composed of a stream file (*.m2ts) and a clip-info file (*.clpi).

The playlist directory (PLAYLIST) includes a plurality of playlist files (*.mpls). Each playlist file (*.mpls) includes one or more playitems (PlayItem) and one or more sub-playitems (SubPlayItem). Each playitem (PlayItem) and each sub-playitem (SubPlayItem) are adapted to designate a playing interval during which a specific clip is reproduced. The playitem (PlayItem) and the sub-playitem (SubPlayItem) include information associated with a specific clip to be reproduced, i.e., information associated with a reproduction start time (IN-Time) and other information associated with a reproduction termination time (OUT-Time) of the specific clip.

In association with the above-mentioned description, a process for reproducing data using at least one playitem (PlayItem) in the playlist file is referred to as a main path, and a process for reproducing data using individual sub-play items (SubPlayItem) is referred to as a sub-path. The playlist file must contain a single main path. The playlist file may contain at least one sub-path according to the presence or absence of the sub-playitem (SubPlayItem) as necessary.

In conclusion, the playlist file acts as a basic reproduction/management file unit contained in overall reproduction/management file structures for reproducing a desired clip by combination of one or more playitems (PlayItem).

The backup directory (BACKUP) stores a plurality of duplicate files, i.e., a duplicate file (also called "copied files") of the index file "index" storing information associated with disc reproduction, a duplicate file of the object file "MovieObject", duplicate files of all playlist files (*.mpls) contained in the playlist directory (PLAYLIST), and duplicate files of all clip-info files (*.clpi) contained in the clip-info directory (CLIPINF). If the above-mentioned files ("index", "MovieObject", "*.mpls", and "*.clpi") are damaged, a disc reproduction process is also fatally damaged, such that the backup directory (BACKUP) is designed to pre-store duplicate files of the above-mentioned files as backup files.

In association with the above-mentioned description, a method for reproducing a specific title using the above-mentioned disc file structure is shown in FIG. 2.

If a user enters a title reproduction command in association with a title used as an index file (also called "index table"), reproduction of the title begins. A detailed description thereof will hereinafter be described.

The index file (index.bdmv) includes first playback information "First Playback" indicative of information associated with a first reproduction image when data of a corresponding disc is loaded, top menu information "Top Menu" for providing a menu image, and at least one title information "Title #1 □Title #n".

If the optical disc 30 is loaded in the optical recording/reproducing device 10, title menu information associated with the index table is provided to the user via the display 20. If the user selects a specific title or a specific menu contained in a menu image, data reproduction begins according to a scenario pre-defined by a disc manufacturer. In other words, if the user enters a command for reproducing a specific title (e.g., title #1), a specific playlist file is executed according to a command contained in the object file (MovieObject) of the reproduction/management file structure. Thereafter, one or more clips (e.g., Clip #1□Clip #3) constructing the title #1 are reproduced by a specific playitem and/or sub-playitem contained in the playlist file according to the playlist file information.

Figure 3:
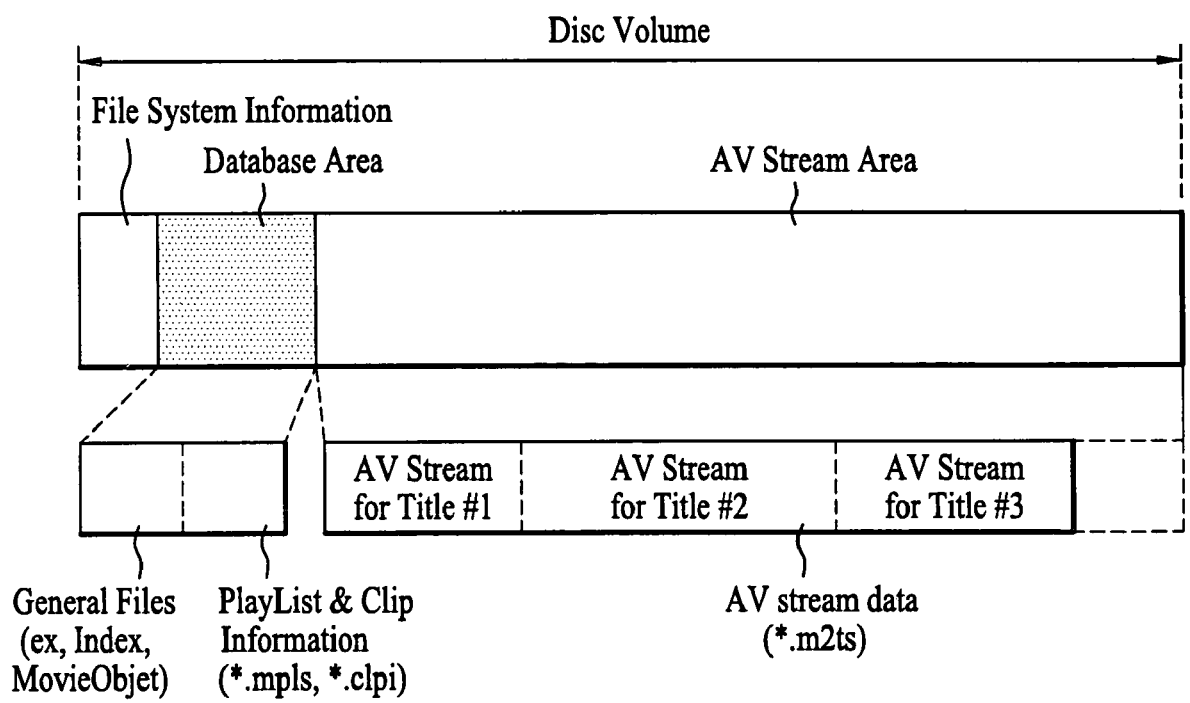
FIG. 3 is a structural diagram illustrating a data record structure of an optical disc acting as a recording medium according to the present invention.

FIG. 3 is a structural diagram illustrating a data record structure recorded in a recording medium according to the present invention. In more detail, FIG. 3 shows a disc record format of information associated with the file structure.

As shown in FIG. 3, from the viewpoint of an inner area of the disc, the above-mentioned disc structure sequentially includes a file system information area serving as system information for managing overall files, a database area for recording a playlist file and a clip-info file to reproduce a recorded AV stream (*.m2ts), and an AV stream area for recording a plurality of streams composed of audio data, video data, and graphic data, etc. Particularly, it should be noted that data recorded in the AV stream area may be determined to be original data as previously stated above.

The present invention provides a method and apparatus for simultaneously reproducing original data (e.g., a file structure shown in FIG. 2) recorded in the disc and additional data recorded in the local storage, and a variety of preferred embodiments according to the present invention will hereinafter be described.

Figure 4A:
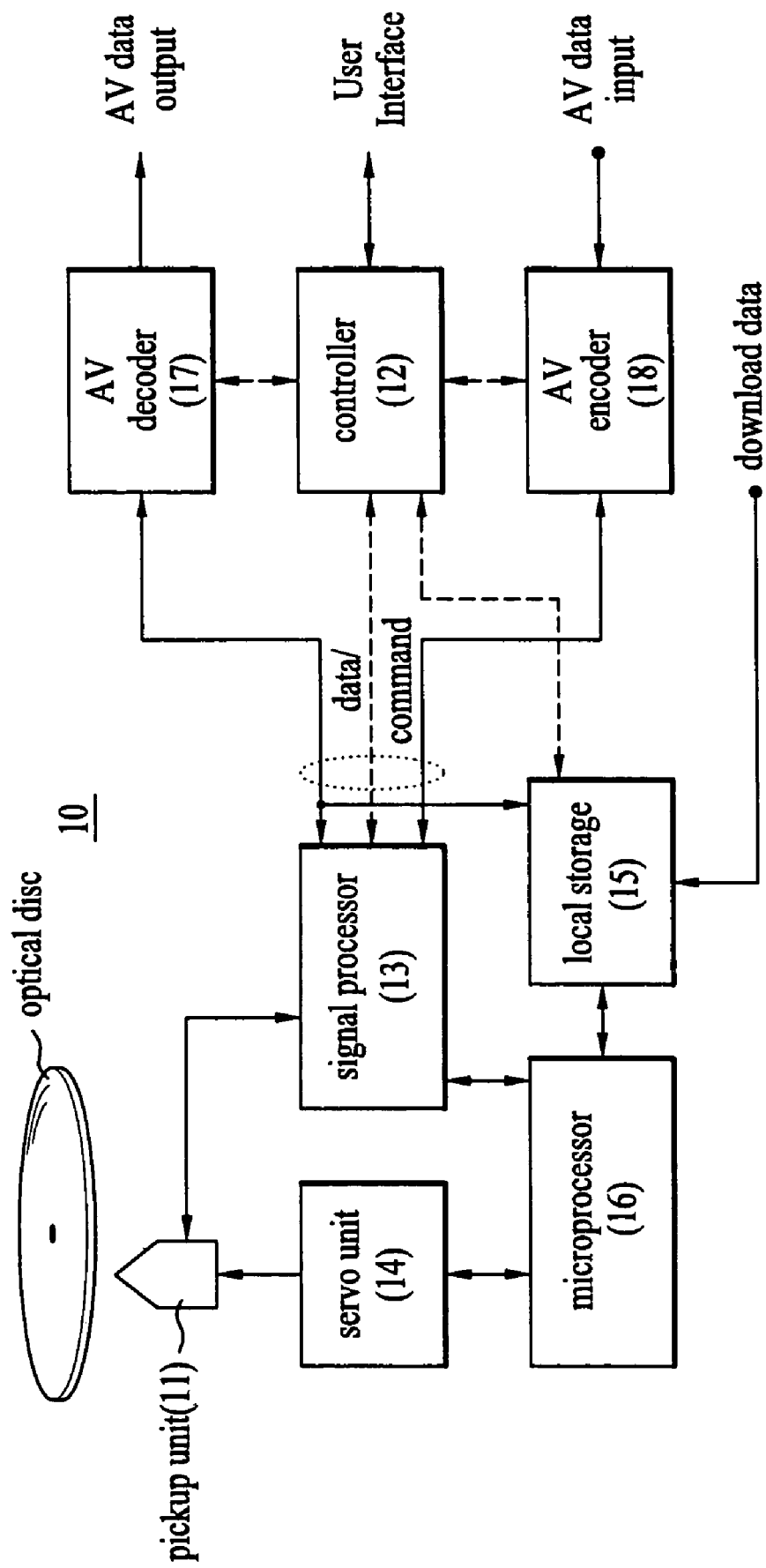
FIG. 4A is a block diagram illustrating an optical recording/reproducing device according to the present invention.

FIG. 4A is a block diagram illustrating the optical recording/reproducing device 10 according to the present invention.

Referring to FIG. 4A, the optical recording/reproducing device 10 includes a pickup unit 11, a servo unit 14, a signal processor 13, and a microprocessor 16. The pickup unit 11 reproduces original data recorded in the optical disc and management information including reproduction/management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The microprocessor 16 controls overall operations of the above-mentioned components.

A controller 12 downloads additional data from outside of the optical disc upon receiving a command from a user, stores the downloaded additional data in the local storage 15, and configures a binding unit using Binding Unit Manifest Information recorded in Binding unit manifest files of the local storage. In addition, the controller 12 configures a virtual file structure (hereinafter referred to as a virtual package) using the binding unit manifest information recorded in the binding unit manifest files, such that it can reproduce data contained in the recording medium and data contained in the local storage. The controller reproduces the original data and/or the additional data using the virtual package upon receiving a request from a user.

The virtual package formed by the controller 12 includes at least one virtual playlist including a playitem capable of reproducing a plurality of clips.

The AV decoder 17 finally decodes output data (i.e., original data and/or additional data) upon receiving a control signal from the controller 12, and provides the user with the decoded result.

The AV encoder 18 converts an input signal into a specific format signal (e.g., an MPEG2 transport stream) upon receiving a control signal from the controller 12, and transmits the converted result to the signal processor 13.

The new virtual package may be stored in the local storage 15 such that it can be re-used in future. Also, the new virtual package may be temporarily stored in an additional dynamic memory, and may then be used.

FIG. 4B is a block diagram illustrating an apparatus for reproducing data of an optical disc using a local storage from among overall components contained in the optical recording/reproducing device 10 according to the present invention.

Information stored in the local storage 15 will hereinafter be described. The local storage 15 according to the present invention stores file information (Directory-File for disc_ID #n dependent) including directories and files for every individual disc identification (ID) information, and a plurality of additional clips downloaded from an external part.

The local storage 15 may include binding unit manifest information for forming a binding unit of the local storage 15, and performing a binding operation associated with a disc package.

Specifically, the local storage 15 may include a plurality of file information units (Directory-File for disc_ID #n dependent) to cope with different discs. Therefore, the local storage 15 additionally requires a file system for managing the above-mentioned file information units. Specifically, the file system is also referred to as a local storage file system 41, and the local storage file system 41 is indicative of a system for managing all files stored in the local storage 15.

Therefore, if an optical disc (e.g., disc_ID #1) of a specific disc ID (disc_ID) is loaded in the optical recording/reproducing device 10, the controller 12 contained in the optical recording/reproducing device 10 recognizes ID information of the disc using the pickup unit 11 and the signal processor 13. If the local storage 15 stores file information, the controller reads binding unit file information equal to the loaded disc ID information from among all file information units stored in the local storage 15, forms a virtual package by binding (or combining) the read information and the disc package, and reproduces both the original data of the disc and the additional data of the local storage using the formed virtual package.

In association with the above-mentioned description, if no file information exists in the local storage 15, the optical recording/reproducing device downloads data from an external input source to form a binding unit, reads the binding unit file information, and forms a virtual package by binding (or combining) the read information with the disc package.

A method for forming the virtual package according to the present invention will hereinafter be described with reference to FIG. 5.

Figure 5:
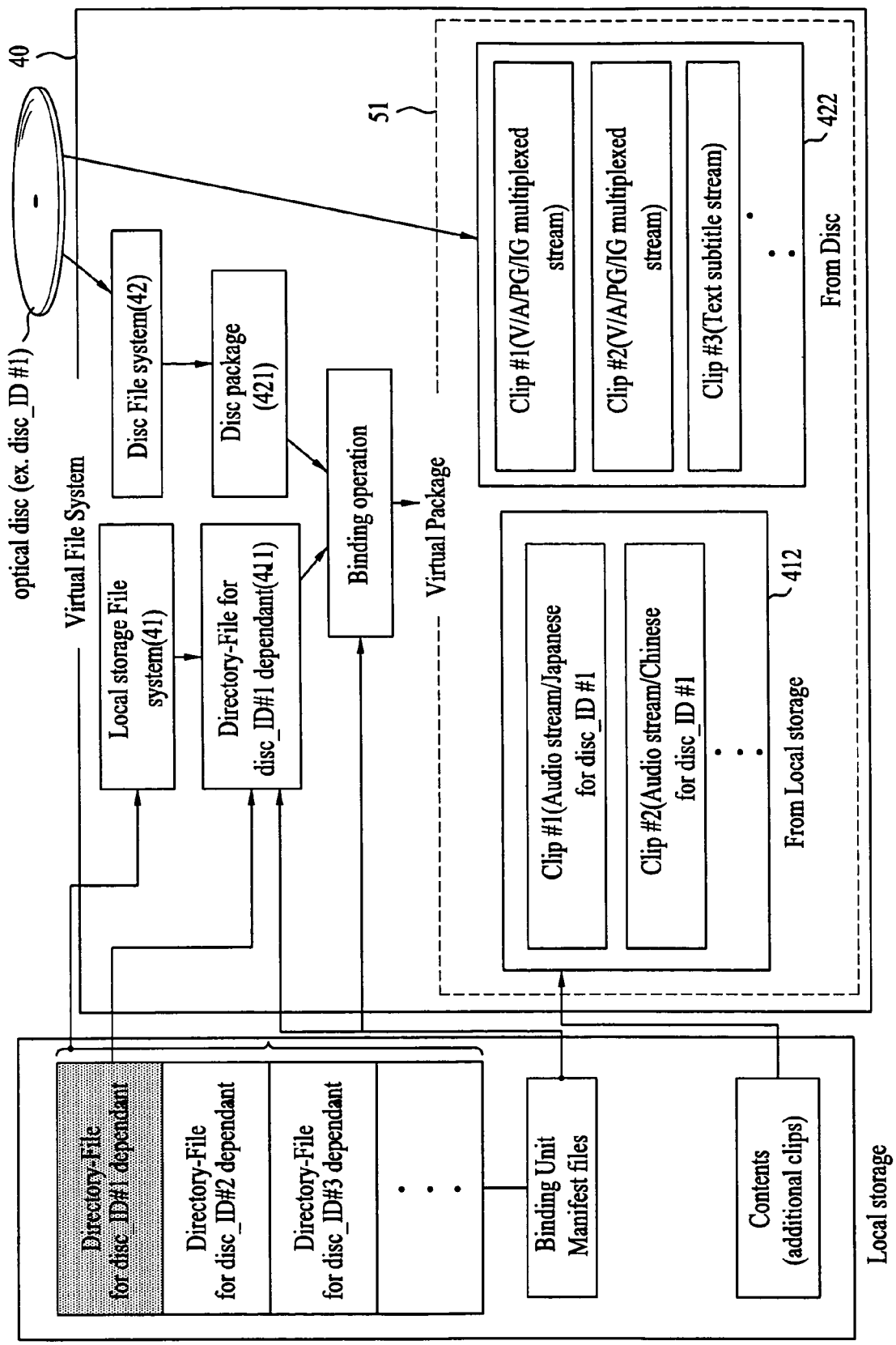
FIG. 5 is a conceptual diagram illustrating a method for forming a virtual package capable of simultaneously reproducing data recorded in a recording medium and data recorded in a local storage according to the present invention.

FIG. 5 is a conceptual diagram illustrating a method for forming the virtual package according to the present invention.

Referring to FIG. 5, if a specific disc is loaded in the optical recording/reproducing device 10 on the condition that the information and contents shown in FIG. 4b are stored in the local storage 15, the optical recording/reproducing device 10 reads the file system information 41 contained in the local storage 15, and at the same time reads disc file system information 42 including the file structure recorded in the disc, resulting in the creation of the VFS. In more detail, the virtual file system (VFS) is indicative of a file system virtually formed to manage both the file system contained in the local storage 15 and the other file system of the loaded disc.

The optical recording/reproducing device forms a new virtual package to simultaneously reproduce original data recorded in the disc and additional data recorded in the local storage using the above-mentioned virtual file system (VFS). For this purpose, the optical recording/reproducing device 10 reads file information (Directory-File for disc_ID #1 dependent) associated with the disc (e.g., disc_ID #1) from the file system, forms a binding unit according the read binding unit manifest information, reads the formed binding unit, and performs a binding operation for replacing the read file information with a disc package of the loaded disc (disc_ID #1) or appending the read file information to the disc package.

In association with the above-mentioned description, the binding unit manifest information according to the present invention is indicative of information recorded in the binding unit manifest files, and is used when the binding unit is formed or when the binding operation is executed. In addition, progressive playlist information and credential information may also be included in the aforementioned binding unit manifest files, and a detailed description thereof will be described later.

The virtual package formed by the above-mentioned binding operation is indicative of a file structure for reproducing/managing an original clip 422 and an additional clip 412. The original clip 422 is composed of original data recorded in the disc. The additional clip 412 is composed of additional data recorded in the local storage.

Figure 6:
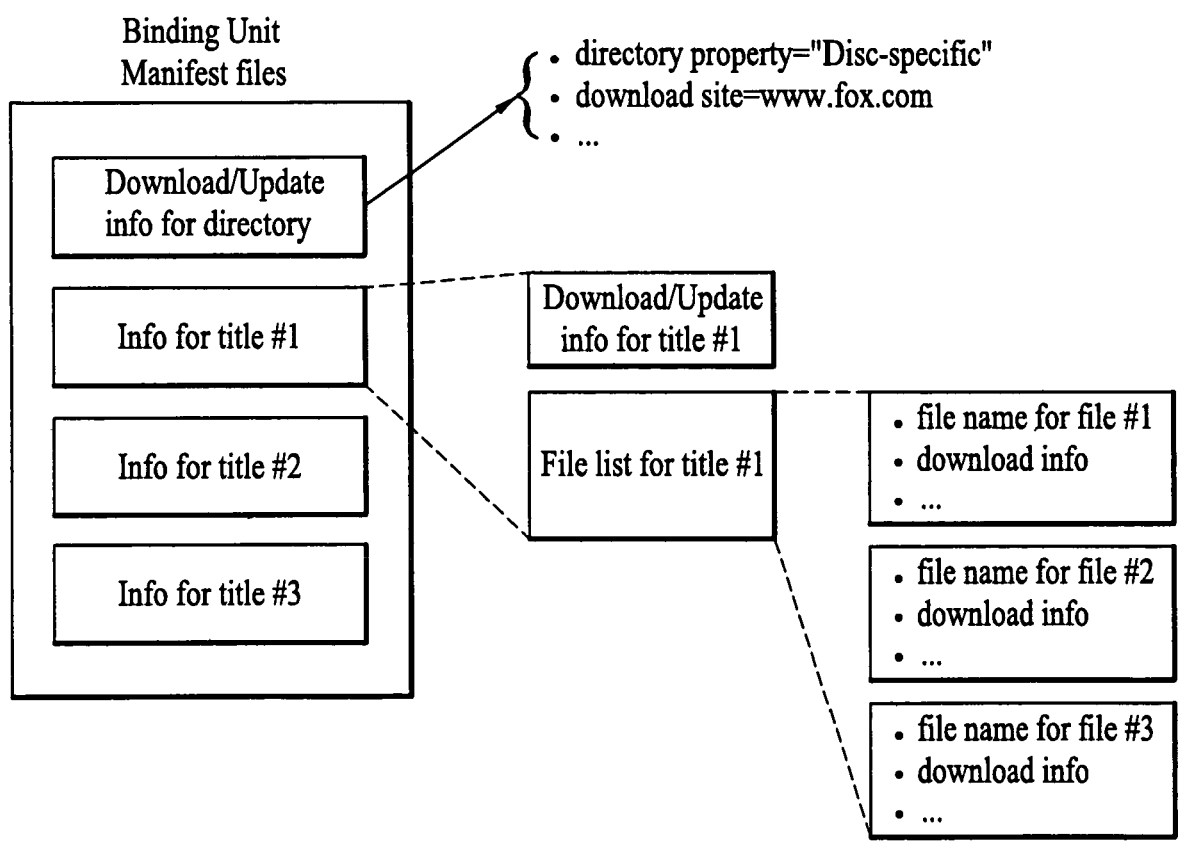
FIG. 6 is a structural diagram illustrating binding unit manifest information recorded in binding unit manifest files according to the present invention.

FIG. 6 is a structural diagram illustrating binding unit manifest information recorded in binding unit manifest files according to the present invention.

In association with the above-mentioned description, the binding unit manifest information for constructing the binding unit manifest files includes: file list information for individual titles; and name mapping information associated with files contained in the virtual package.

Preferably, the binding unit manifest files of a disc and all files referenced by the binding unit manifest files may be read-only files. Preferably, the binding unit manifest files may be replaced with others when a title is changed to another title.

As can be seen from FIG. 6, the binding unit manifest files include download/update information for a directory and title information.

The download/update information for the directory may have the following information.

Firstly, the download/update information for the directory includes directory property information indicating that the aforementioned download/update information is located under which one of directories (i.e., a disc-specific directory, a disc-shared directory, and an org-shared directory). In this case, the disc-specific directory is indicative of a directory composed of files of individual discs, the disc-shared directory is commonly applied to a disc provided from a disc author acting as a content provider (CP), and the org-shared directory is commonly applied to the disc author acting as the CP.

FIG. 6 shows an example in which the directory property is equal to the disc-specific directory (i.e., "Directory Property=Disc-specific"), such that it should be noted that the binding unit manifest files are contained in the disc-specific directory.

Secondly, if the local storage downloads external input sources, the downloaded data may include CP site information. FIG. 6 shows an example in which the download site is indicative of the 20th Fox Century Web site on the Internet (i.e., Download site=www.fox.com).

Thirdly, the local storage of the optical recording/reproducing device downloads data from an external CP. In this case, download time information of the last data at the latest time from among the overall data stored in the local storage and update time information of the local storage may be included in the aforementioned download/update information.

Fourthly, the aforementioned download/update information may include information necessary for a cleanup operation of the local storage and disc version information.

In addition, the aforementioned title information may include the following information.

In association with the above-mentioned description, the title information includes download/update information for individual titles and file list information for individual titles. For example, the title information includes a file name for each file contained in a corresponding title, download information associated with the title, and a virtual package. A detailed description of the title information will hereinafter be described.

Firstly, the title information includes constituent information of a binding unit from among the downloaded additional data. In other words, the title information includes specific information indicative of file locations and file names contained in the binding unit, from among the files downloaded in the binding unit data area directory (BindingUnit Data) contained in the local storage.

Secondly, the title information includes constituent information of individual files of the virtual package. In other words, individual files corresponding to the binding unit include specific information indicative of location- and file name-information in the virtual package. This specific information is referred to as name mapping information. In more detail, the name mapping information determines a specific file contained in the binding unit to be located in a specific directory of the virtual package and to have a specific file name, and a detailed description thereof will hereinafter be described with reference to FIGS. 7a□9.

Thirdly, the title information includes encryption information, and can be adapted to verify reliability (also called "credential characteristics"). In more detail, the verified binding unit manifest files can be effectively used only.

A variety of preferred embodiments of the local storage file structure including the aforementioned binding unit manifest files, and a method for forming the binding unit according to the aforementioned preferred embodiments will hereinafter be described with reference to FIGS. 7B□8B.

Figure 7A:
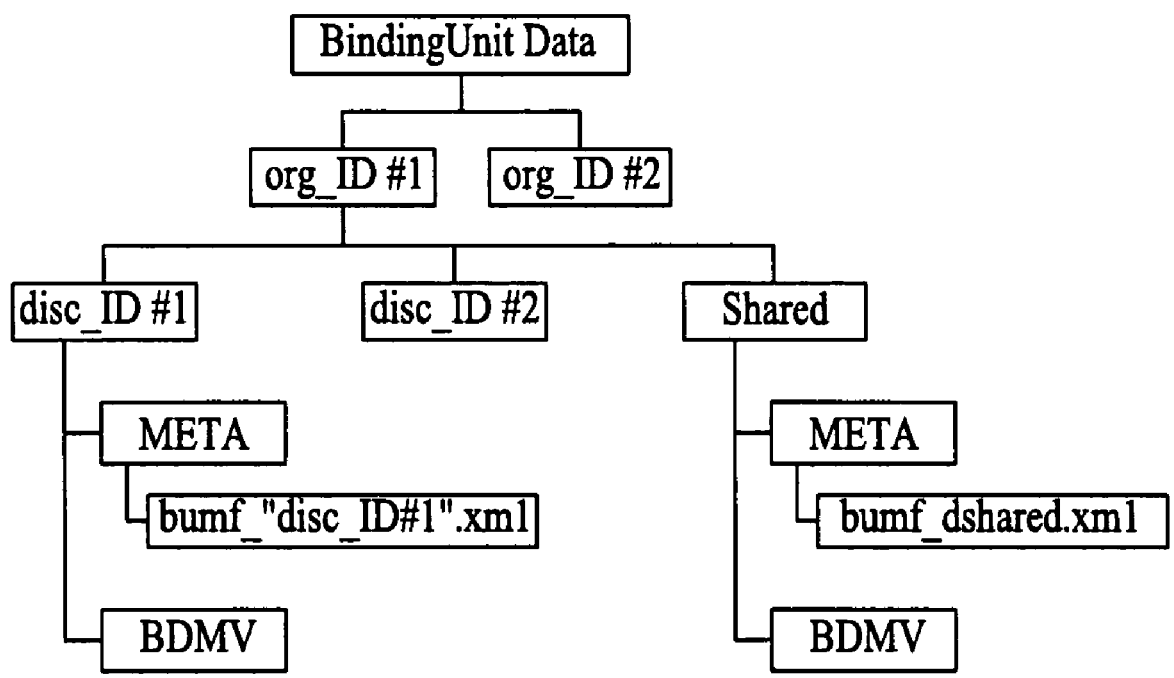
FIG. 7A is a structural diagram illustrating a file structure of a local storage for downloading additional data in accordance with a first preferred embodiment of the present invention.

FIG. 7A is a structural diagram illustrating a file structure of a local storage for downloading additional data in accordance with a first preferred embodiment of the present invention. Specifically, FIG. 7A shows individual locations of the binding unit manifest files.

Referring to FIG. 7A, a binding unit data directory (BindingUnit Data) is used as an upper directory. The binding unit data directory (BindingUnit Data) includes a plurality of organization files (e.g., org_ID #1 and org_ID #2) of individual content providers (CPs). In this case, the number of organization directories is equal to the number of CPs. It should be noted that a shared directory (Shared) (not shown) of individual CPs may exist in FIG. 7A.

A lower directory of the org directory (e.g., the org_ID #1 directory) for each CP includes Disc-specific directories (disc_ID #1 and disc_ID #2) classified according to recording-medium attributes, and further includes a disc-shared directory (Shared) shared by individual discs.

A lower directory of the disc-specific directory (disc_ID #1) includes a metadata directory (META) and a BD directory (BDMV). The BD directory (BDMV) is indicative of a directory capable of storing files (e.g., *.mpls, *.clpi, *.m2ts, *.bdmv, and *.otf, etc.) indicative of unique data for each disc from among downloaded data stored in the local storage. The META directory includes a binding unit manifest file (bumf_"disc_ID #1".xml).

In this case, the reason why the binding unit manifest files are represented by "XML" languages is that the binding unit manifest files use the same language as that of the metadata. The file names of the aforementioned binding unit manifest files are represented by "bumf_"disc_ID".xml", "bumf_dshared.xml", and "bumf_oshared.xml" in the same manner as in the metadata regulation. In this case, the "bumf_"disc_ID".xml" file and the "bumf_dshared.xml" file are contained in the disc-shared directory, and the "bumf_oshared.xml" file is contained in the org-shared directory. The reason why the binding unit manifest files are located under the META directory is that another metadata may be located as metadata in the same directory as the META directory.

The present invention proposes a file structure. According to this file structure, the META directory is not located under the disc-specific directory (disc_ID #1), and the binding unit manifest file (bumf_"disc_ID #1".xml) is directly located under the disc-specific directory (disc_ID #1). In other words, the aforementioned file structure means that file location information is irrelevant to metadata.

In association with the above-mentioned description, the binding unit manifest file (bumf_"disc_ID #1".xml) stores binding unit manifest information of a specific disc (disc_ID). As previously stated above, the binding unit manifest information includes file list information of individual titles, individual directories of individual titles, title and/or file's download/update information, and list information of files located under individual directories.

It is well known to those skilled in the art that the disc-specific directory (disc_ID #2) can construct a lower directory having the same structure as that of the disc-specific directory (disc_ID #1).

The remarkable feature of the first preferred embodiment shown in FIG. 7A is that the binding unit manifest files are located under the disc-shared directory (Shared) and the disc-specific directory (disc_ID #1). The binding unit manifest file (bumf_dshared.xml) located under the META directory acting as a lower directory of the disc-shared directory (Shared) stores binding unit manifest information shared by individual discs located under the CP's directory (i.e., the org_ID #1 directory).

In association with the above-mentioned description, according to the preferred embodiment of the present invention, the binding unit manifest file configured in title units can be contained in the META directory including the binding unit manifest file, which acts as a lower directory of each of the disc-specific directory (disc_ID #1) and the shared directory (Shared). In this case, the file name can use the same regulation as in the metadata in the aforementioned case, such that it can be represented by "bumf_"disc_id"_"title_number".xml", "bumf_dshared_"title_number".xml", and "bumf_oshared_"title_number".xml".

For example, if three titles are contained in a disc acting as a single recording medium, the META directory acting as a lower directory of the disc-specific directory (disc_ID #1) includes a plurality of files (i.e., "bumf_"disc_ID#1"_001.xml", "bumf_"disc_ID#1"_002.xml", and "bumf_"disc_ID#1"_003.xml"). In addition, the META directory acting as a lower directory of the disc-shared directory (Shared) includes a plurality of files (i.e., "bumf_dshared_001.xml", "bumf_dshared_002.xml", and "bumf_dshared_003.xml".

Figure 7B:
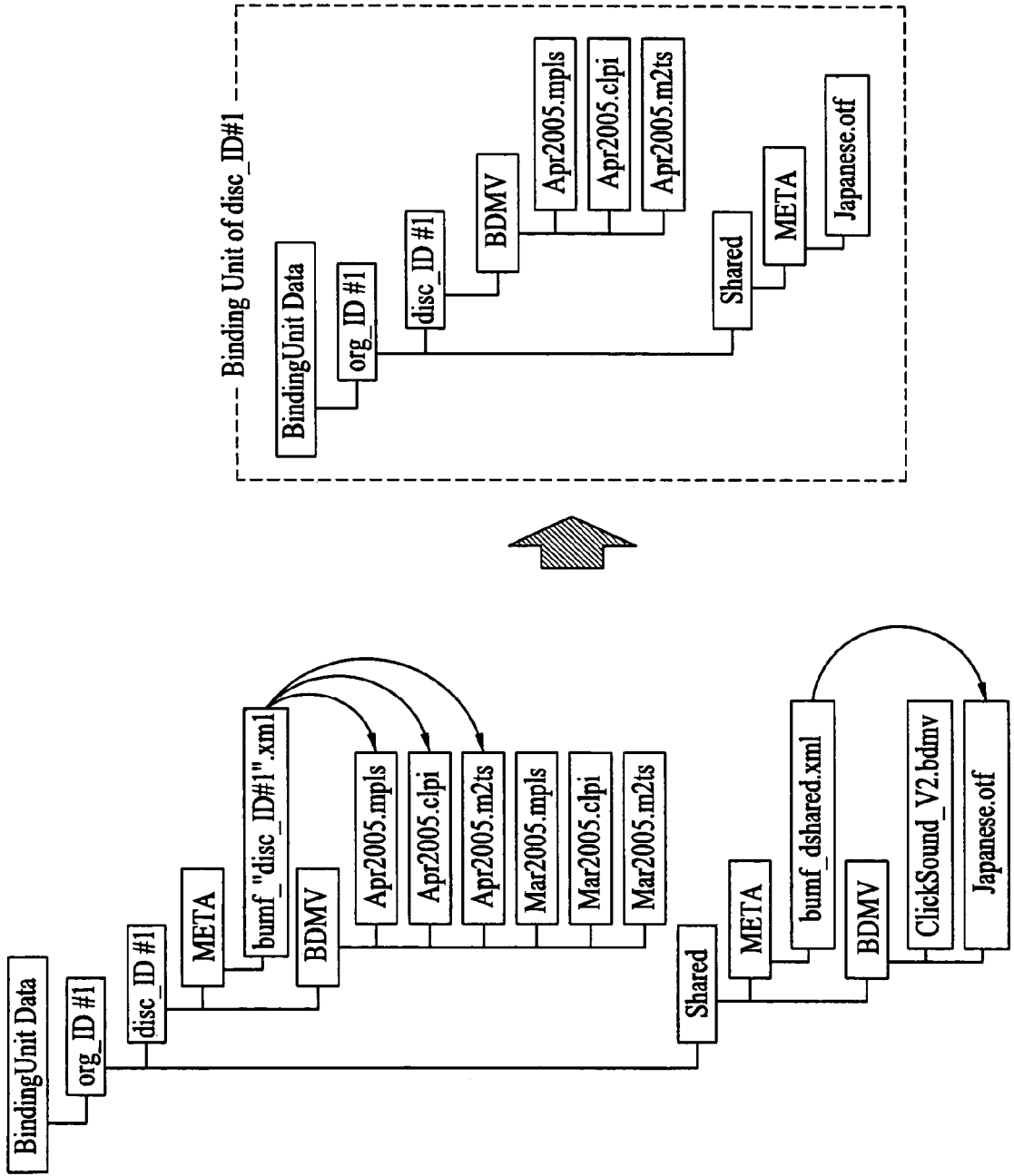
FIG. 7B shows a relationship for forming a binding unit in downloaded data of a local storage including the file structure of FIG. 7A according to the present invention.

FIG. 7B shows a relationship for forming a binding unit in downloaded data of a local storage including the file structure of FIG. 7A according to the present invention.

Referring to FIG. 7B, the CP's directory (org_ID #1) is located under the "BindingUnit Data" directory indicative of a root directory, and the org_ID #1 directory includes a disc-specific directory (disc_ID #1) and a disc-shared directory (Shared).

The META directory including the binding unit manifest file (bumf_"disc_ID #1".xml) is located under the disc-specific directory (disc_ID #1). The disc BD directory (BDMV) includes playlist files (Apr2005.mpls and Mar2005.mpls), clip-info files (Apr2005.clpi and Mar2005.clpi), and stream files (Apr2005.m2ts and Mar2005.m2ts).

The disc-shared directory (Shared) includes the META directory including the binding unit manifest file (bumf_dshared.xml), and the BDMV directory includes AUXDATA files (ClickSound_V2.bdmv and Japanese.otf).

In the case of forming the binding unit of a specific disc (disc_ID #1), the binding unit manifest information of the binding unit manifest file (bumf_"disc_ID #1"xml) of the disc-specific directory (disc_ID #1) of the specific disc (e.g., disc_ID #1) is indicative of a file list composed of the playlist file (Apr2005.mpls), the clip-info file (Apr2005.clpi), and the stream file (Apr2005.m2ts). The binding unit manifest information of the disc-shared directory (Shared) of the specific disc (disc_ID #1) is indicative of a file list composed of the AUXDATA file (Japanese.otf). Therefore, the binding unit formed by the aforementioned two binding unit manifest files (i.e., bumf_"disc_ID #1".xml and bumf_dshared.xml) is as follows.

The file structure of the binding unit includes the org_ID #1 directory of a specific CP in the "BindingUnit Data" directory acting as the root directory. The org_ID #1 directory includes a disc-specific directory (disc_ID #1) and a disc-shared directory (Shared). The disc-specific directory (disc_ID #1) includes the BDMV directory composed of a playlist file (Apr2005.mpls), a clip-info file (Apr2005.clpi), and a stream file (Apr2005.m2ts). The disc-shared directory (Shared) includes the BDMV directory equipped with the AUXDADA file (Japanese.otf).

Figure 8A:
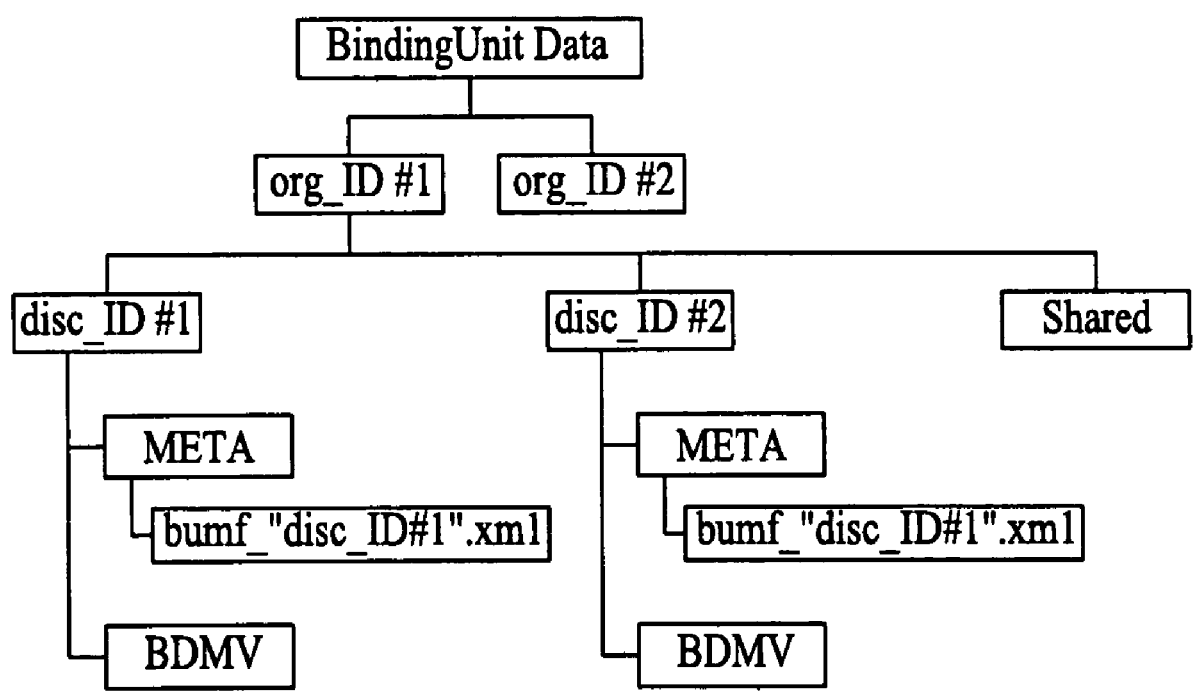
FIG. 8A is a structural diagram illustrating a file structure of a local storage for downloading additional data in accordance with a second preferred embodiment of the present invention.

FIG. 8A is a structural diagram illustrating a file structure of a local storage for downloading additional data in accordance with a second preferred embodiment of the present invention. Specifically, FIG. 8A shows locations of the binding unit manifest files.

The local storage file structure shown in FIG. 8A does not include the binding unit manifest files in which the binding unit manifest information is recorded in the disc-shared directory (Shared), differently from the local storage file structure shown in FIG. 7A.

Referring to FIG. 8A, a binding unit data directory (BindingUnit Data) is used as an upper directory. The binding unit data directory includes a plurality of organization directories (org_ID #1 and org_ID #2) of individual content providers (CPs). In this case, the number of organization directories is equal to the number of CPs. It should be noted that a shared directory (Shared) (not shown) of individual CPs may exist in FIG. 8A.

A lower directory of the org directory (e.g., the org_ID #1 directory) for each CP includes Disc-specific directories (disc_ID #1 and disc_ID #2) classified according to recording-medium attributes, and further includes a disc-shared directory (Shared) shared by individual discs.

A lower directory of the disc-specific directory (disc_ID #1) includes a metadata directory (META) and a BD directory (BDMV). The BD directory (BDMV) is indicative of a directory capable of storing files (e.g., *.mpls, *.clpi, *.m2ts, *.bdmv, and *.otf, etc.) indicative of unique data for each disc from among downloaded data stored in the local storage. The META directory includes a binding unit manifest file (bumf_"disc_ID #1".xml).

In association with the above-mentioned description, the binding unit manifest information contained in the binding unit manifest file (bumf_"disc_ID #1".xml) is associated with a specific disc (e.g., disc_ID #1), and includes information associated with files stored in the disc-shared directory (Shared). Therefore, the local storage file structure shown in FIG. 8A is characterized in that it does not include the binding unit manifest file (e.g., bumf_dshared.xml) in the disc-shared directory (Shared), differently from the local storage file structure shown in FIG. 7A.

The disc-specific directory (disc_ID #2) has the same structure as that of the disc-specific directory (disc_ID #1), such that the binding unit manifest file for use in the disc_ID #2 directory is denoted by bumf_"disc-ID #2".xml.

Figure 8B:
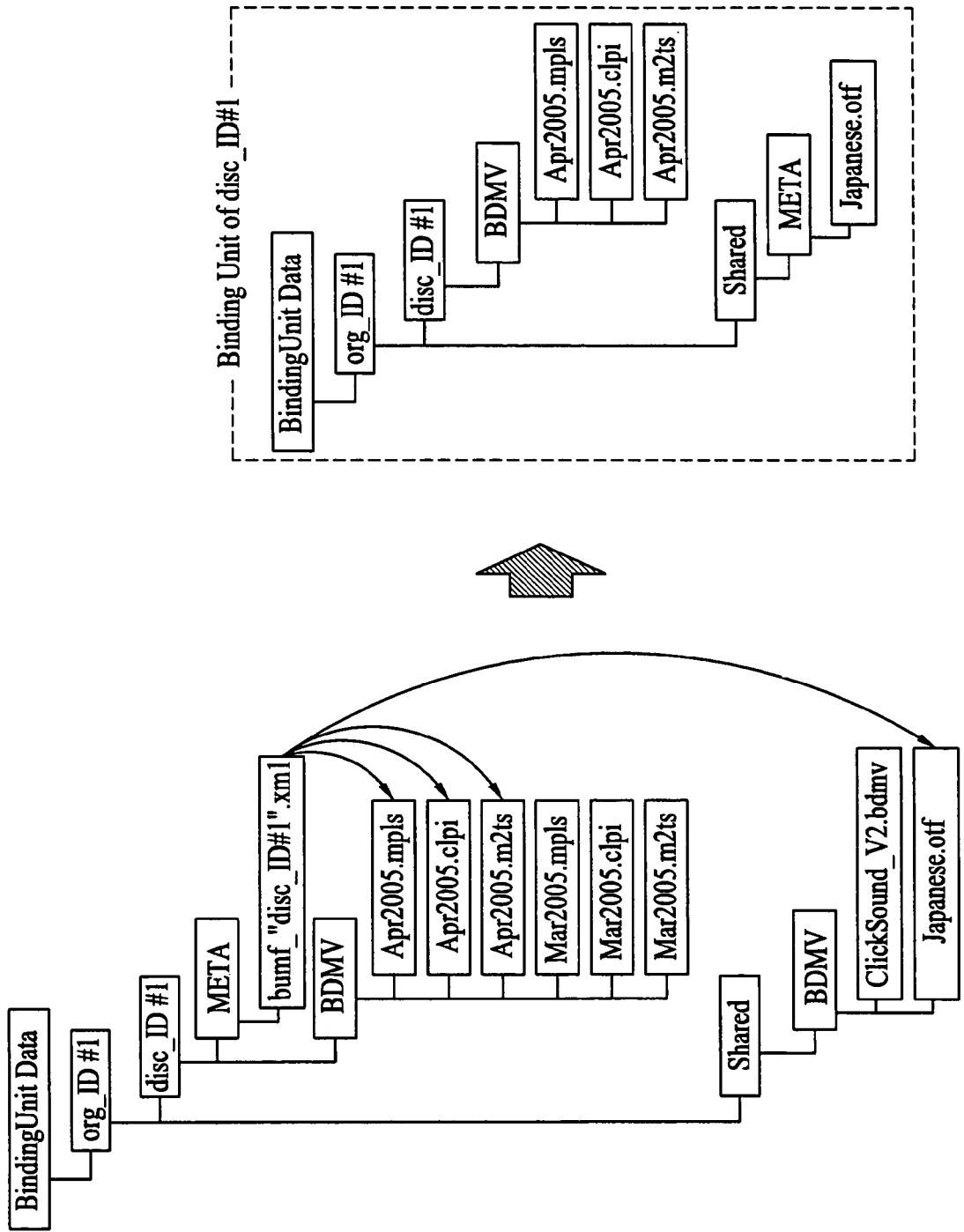
FIG. 8B is a conceptual diagram illustrating a method for forming a binding unit in downloaded data of a local storage including the file structure of FIG. 8A according to the present invention.

FIG. 8B is a conceptual diagram illustrating a method for forming a binding unit in downloaded data of a local storage including the file structure of FIG. 8A according to the present invention.

Referring to FIG. 8B, compared with the local storage structure shown in FIG. 7B when forming the same structure as that of the binding unit of a specific disc (e.g., disc_ID #1) formed in FIG. 7B, the local storage file structure shown in FIG. 8B is characterized in that the disc-shared directory (Shared) has no META directory including the binding unit manifest file (bumf_dshared.xml).

When forming the binding unit of a specific disc (e.g., disc_ID #1), the binding unit manifest information contained in the binding unit manifest file (bumf_"disc_ID #1".xml) of the specific disc (disc_ID #1) is indicative of file list information composed of a playlist file (Apr2005.mpls), a clip-info fie (Apr2005.clpi), and a stream file (Apr2005.m2ts), and is also indicative of file list information of the AUXDATA file (Japanese.otf) contained in the disc-shared directory (Shared), such that the binding unit formed by the binding unit manifest file (bumf_"disc_ID #1".xml) in FIG. 8B is equal to the binding unit shown in FIG. 7B.

A method for forming a virtual package by performing a binding operation for binding (or combining) the binding units of FIGS. 7B and 8B with a disc package will hereinafter be described.

FIG. 9 is a conceptual diagram illustrating a method for forming a virtual package using a virtual file system (VFS) on the basis of a file structure according to the present invention.

Referring to FIG. 9, a specific file structure (i.e., the disc package of FIG. 2) is recorded in the loaded disc, and may be referred to as a disc package. A local storage file system 41 is contained in the local storage. The local storage file system 41 includes a binding unit combined with the loaded disc (e.g., disc_ID #1), and Binding Unit Manifest files.

In association with the above-mentioned description, although the binding unit is basically similar to the disc file structure (i.e., the disc package), it should be noted that the binding unit cannot be operated as a reproduction/management file by itself, differently from the disc package.

If it is assumed that the binding unit is designed to perform data reproduction by itself, this data reproduction is similar to data reproduction of the local storage, such that the above-mentioned operations of the binding unit are contrary to the purpose of the present invention for simultaneously reproducing both original data recorded in the disc and additional data recorded in the local storage.

The binding unit manifest information includes various information of the binding unit. For example, the binding unit manifest information includes list information of files of the binding unit, location information where the files of the binding unit are located in the virtual package when the binding unit is combined with the disc, and file name information in the virtual package, etc.

Therefore, the virtual file system (VFS) performs a binding operation for combining the binding unit with the disc package of the loaded disc using the above-mentioned binding unit manifest information, such that it forms a new virtual package.

For example, according to the disc package of the disc shown in FIG. 9, the BDMV directory acting as a lower directory of the root directory includes an index file (index.bdmv), an object file (MovieObject.bdmv), a playlist file (00000.mpls), a clip-info file (01000.clpi), a stream file (01000.m2ts), and an AUXDATA file (sound.bdmv). Under the aforementioned condition of the disc package, if the binding unit associated with the loaded disc (e.g., disc_ID #1) includes a specific playlist file (Apr2005.mpls), and clips (i.e., a clip-info file (Apr2005.clpi) 62 and a stream file (Apr2005.m2ts) 63) managed by the playlist file (Apr2005.mpls), and the disc-shared directory (Shared) includes an AUXDATA file (Japanese.otf) 64, the method for forming the virtual package is as follows.

The binding unit manifest information according to the present invention is indicative of information associated with files contained in the binding unit. A playlist file (Apr2005.mpls) 61 is changed (or modified) to a playlist file (00000.mpls) 71 of the playlist directory (PLAYLIST) in the virtual package, a clip-info file (Apr2005.clpi) 62 is changed to a clip-info file (02000.clpi) 72 of the clip-info directory (CLIPINF) in the virtual package, a stream file (Apr2005.m2ts) 63 is changed to a stream file (02000.m2ts) 73 of the stream directory (STREAM) in the virtual package, and an AUXDATA file (Japanese.otf) 64 is changed to an AUXDATA file (11111.otf) 74 of the auxiliary data directory (AUXDATA) in the virtual package. The binding unit manifest information includes list information of files associated with file locations.

Therefore, when the virtual file system (VFS) performs the binding operation, if the binding operation is performed according to the binding unit manifest information recorded in the binding unit manifest files of the local storage 15 and the virtual package is formed by the binding operation, the resultant file structure is as follows.

The virtual package 51 includes the BDMV directory acting as a lower directory of the root directory. The BDMV directory includes an index file (Index.bdmv), an object file (MovieObject.bdmv), a playlist directory (PLAYLIST), a clip-info directory (CLIPINF), a stream directory (STREAM), and an auxiliary data directory (AUXDATA). The playlist directory (PLAYLIST) includes a playlist file (00000.mpls) 71 acting as a substitute for the playlist file of the binding unit, the clip-info directory (CLIPINF) appends a clip-info file (02000.clpi) 72 to the clip-info file (01000.clpi)

of the recording medium, the stream directory (STREAM) appends a stream file (02000.m2ts) 73 to the stream file (01000.m2ts) of the recording medium, and the AUXDATA directory (AUXDATA) appends an AUXDATA file (11111.otf) 74 to the AUXDATA file (sound.bdmv) of the recording medium, such that the virtual package 51 is formed.

In other words, if the file name of additional data contained in the binding unit mapped to the aforementioned virtual package is equal to that of original data contained in the recording medium, the additional data files are replaced with others, so that the virtual package is formed. Otherwise, if the file name of additional data contained in the binding unit mapped to the aforementioned virtual package is different from that of original data contained in the recording medium, the additional data files are appended to the recording medium files, such that the additional data and the original data form the virtual package.

In association with the above-mentioned description, the index file (index.bdmv) and the object file (MovieObject.bdmv), which act as upper files of the virtual package, may be updated in conventional index and object files (Index.bdmv and MovieObject.bdmv) contained in the disc on the basis of the newly-formed virtual playlist file (00000.mpls) 71. Specifically, if a title is changed to another title by the playlist file (00000.mpls) 71 contained in the virtual package (e.g., if a new title is added, a conventional title is deleted, or a title reproduction scenario is changed to another scenario), the aforementioned index and object files may be updated on the basis of the newly-formed virtual package.

In association with the above-mentioned description, the downloading/updating operations according to the present invention can update the virtual file system (VFS) using the following steps.

Firstly, the downloading application recognizes current binding unit structure information contained in the disc-specific directory and the disc-shared directory (Shared), and informs an external CP of the recognized binding unit structure information. A user selects content data downloaded for reproducing data of the disc.

Thereafter, the CP provides all data (e.g., an index table and a playlist, etc.) of database files appropriate for a disc on the basis of the report result received from the downloading application associated with the current binding unit structure information.

Finally, the downloading application of the optical recording/reproducing device downloads data of the selected files for the disc in the local storage, stores the downloaded data in the local storage, and updates the virtual file system (VFS).

Figure 10:
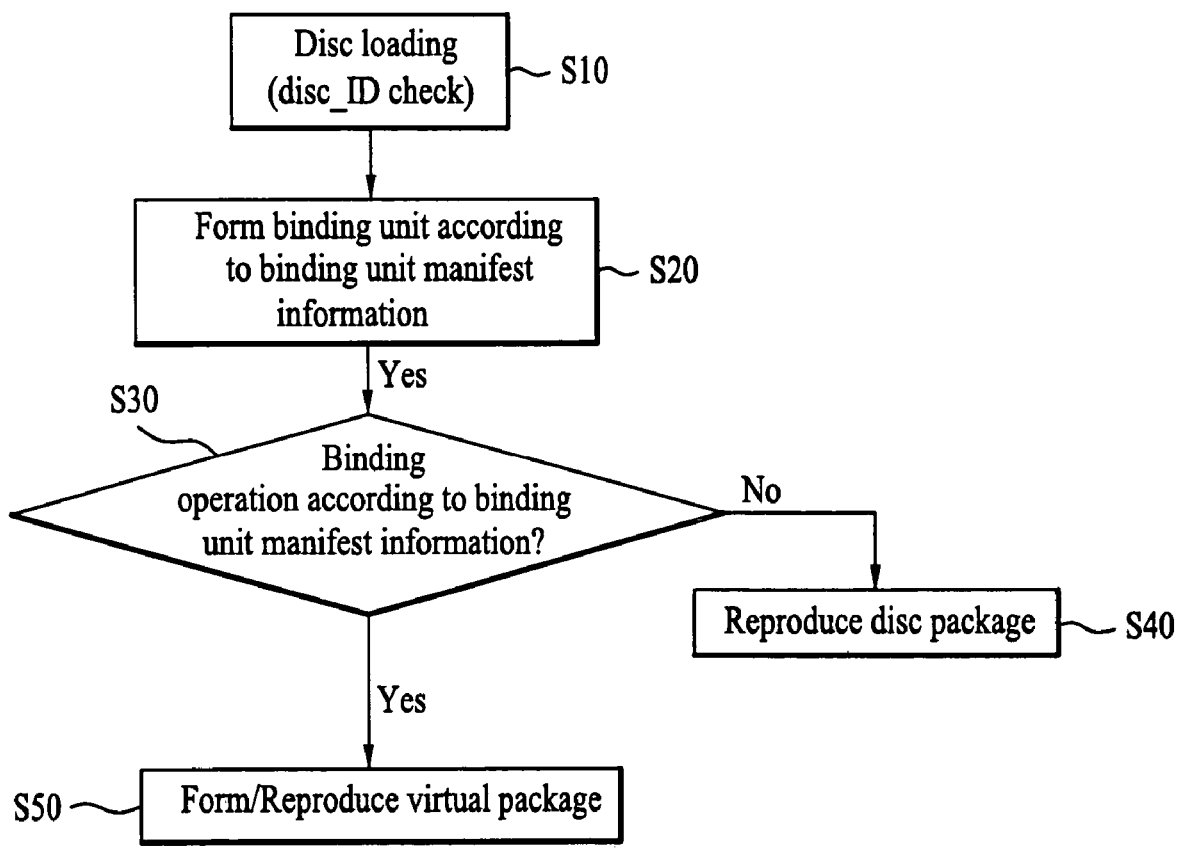
FIG. 10 is a flow chart illustrating a method for reproducing data from a recording medium using a local storage according to the present invention.

FIG. 10 is a flow chart illustrating a method for reproducing data from a recording medium using a local storage according to the present invention.

Referring to FIG. 10, if a disc is loaded in an optical recording/reproducing device, the optical recording/reproducing device recognizes disc ID information (disc_ID), and downloads additional data in a local storage from an external CP over the Internet or a communication network, etc.

The binding unit is formed in the downloaded data at step S20, such that the binding unit can be combined with a disc package in the downloaded data. In this case, the binding unit is formed according to binding unit manifest information recorded in the downloaded binding unit manifest files.

It is determined whether the binding operation for combining the binding unit with the disc package is performed according to the binding unit manifest information recorded in the binding unit manifest files at step S30.

If it is determined that the binding operation is not performed at step S30, the optical recording/reproducing device reproduces original data using the disc package recorded in the disc at step S40.

If it is determined that the binding operation is performed at step S30, the virtual package is formed via the binding operation, and the original data stored in the disc and/or the additional data stored in the local storage are reproduced using the formed virtual package at step S50.

In association with the above-mentioned description, provided that additional data is pre-downloaded from an external input source before data of the recording medium is loaded, and the binding unit is formed, it is determined whether a current recording medium is indicative of a recording medium whose data can be reproduced along with data stored in the local storage, and then the virtual package is formed.

As apparent from the above description, a method and apparatus for reproducing data from a recording medium using a local storage according to the present invention can effectively reproduce original data recorded in a recording medium and additional data, resulting in the creation of more convenient functions for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data from a recording medium using a local storage, comprising:

downloading additional data and a binding unit manifest file for managing a binding operation of the downloaded additional data and original data recorded in the recording medium, and storing the additional data and the binding unit manifest file in the local storage;

determining a binding unit to be bound to the original data from among the downloaded additional data according to the binding unit manifest file;

performing a binding operation for binding the binding unit with the original data according to the binding unit manifest file to form a virtual package; and reproducing the additional data and the original data using the formed virtual package, wherein the local storage includes a file structure including a first directory (org ID) for identifying a content provider (CP), wherein the first directory (org ID) includes at least one second directory (disc ID) for identifying individual recording mediums provided from the content provider (CP), and a third directory (Shared) shared by individual recording mediums provided from the content provider (CP), wherein the binding unit manifest file is contained in the second directory (disc ID).

2. The method according to claim 1, wherein the additional data and the binding unit manifest file correspond to a prescribed recording medium.

3. The method according to claim 1, wherein the binding unit manifest file includes a file name contained in the binding unit combined with the recording medium from among the additional data.

4. The method according to claim 3, wherein the binding unit manifest file includes name mapping information mapping the additional data file name contained in the binding unit to a file name contained in the virtual package.

5. The method according to claim 1, wherein the second directory (disc_ID) includes a metadata directory (META), and the binding unit manifest file is contained in the metadata directory (META).

6. The method according to claim 1, wherein the second directory (disc_ID) and the third directory (Shared) include the metadata directory (META), respectively, and the binding unit manifest file is contained in the metadata directory (META).

7. The method according to claim 1, wherein the binding unit manifest file includes information associated with a content provider (CP) for providing the additional data.

8. The method according to claim 1, wherein the binding unit manifest file includes file list information for classifying additional data in title units.

9. The method according to claim 1, wherein the step for reproducing data using the virtual package is performed by a virtual file system (VFS).

10. A method for forming a virtual package comprising:
    downloading an additional data and a binding unit manifest file for managing a binding operation of the downloaded additional data and original data recorded in the recording medium, and storing the additional data and the binding unit manifest file in the local storage;
    determining a binding unit to be bound to the original data from among the downloaded additional data according to the binding unit manifest file;
    performing a binding operation for binding the binding unit with original data according to the binding unit manifest file to form a virtual package; and
    allowing the binding unit manifest file to include an additional data file name mapped to the virtual package, and forming the virtual package using the additional data when the additional data file name is equal to an original data file name,
    wherein the local storage includes a file structure including a first directory (org_ID) for identifying a content provider (CP), wherein
    the first directory (org_ID) includes at least one second directory (disc_ID) for identifying individual recording mediums provided from the content provider (CP), and a third directory (Shared) shared by individual recording mediums provided from the content provider (CP),
    wherein the binding unit manifest file is contained in the second directory (disc ID).

11. The method according to claim 10, further comprising:
    if the additional data file name mapped to the virtual package is different from the original data file name contained in a recording medium, constructing all of the original data and the additional data in the form of the virtual package.

12. An apparatus for reproducing data from a recording medium using a local storage, comprising:
    a pickup unit configured to read original data from the recording medium;
    a local storage configured to store additional data associated with the original data and a binding unit manifest file for managing a binding operation of the downloaded additional data and original data recorded in the recording medium; and
    a controller configured to determine a binding unit to be bound to the original data from among the additional data according to the binding unit manifest file, perform a binding operation for binding the binding unit with the original data according to the binding unit manifest file to form a virtual package, and to reproduce additional data and original data using the formed virtual package,
    wherein the local storage includes a file structure including a first directory (org_ID) for identifying a content provider (CP), wherein
    the first directory (org_ID) includes at least one second directory (disc_ID) for identifying individual recording mediums provided from the content provider (CP), and a third directory (Shared) shared by individual recording mediums provided from the content provider (CP),
    wherein the binding unit manifest file is contained in the second directory (disc ID).

13. The apparatus according to claim 12, wherein the controller recognizes an additional data file name mapped to the virtual package on the basis of the binding unit manifest file, and constructs the virtual package in the form of an additional data file when the additional data file name is equal to an original data file name.

14. The apparatus according to claim 12, wherein the controller recognizes an additional data file name mapped to the virtual package on the basis of the binding unit manifest file, and constructs all of the original data and the additional data in the form of the virtual package.

* * * * *